Aug. 13, 1968 J. L. ENGLESBERG 3,396,847
FILTERING APPARATUS ADJUSTABLE FOR SERIES
OR PARALLEL FILTRATION
Filed Jan. 13, 1967 3 Sheets-Sheet 1

INVENTOR:
JULIUS L. ENGLESBERG
BY
Braitenfeld & Lewrie
ATTORNEYS

Aug. 13, 1968  J. L. ENGLESBERG  3,396,847
FILTERING APPARATUS ADJUSTABLE FOR SERIES
OR PARALLEL FILTRATION
Filed Jan. 13, 1967   3 Sheets-Sheet 2
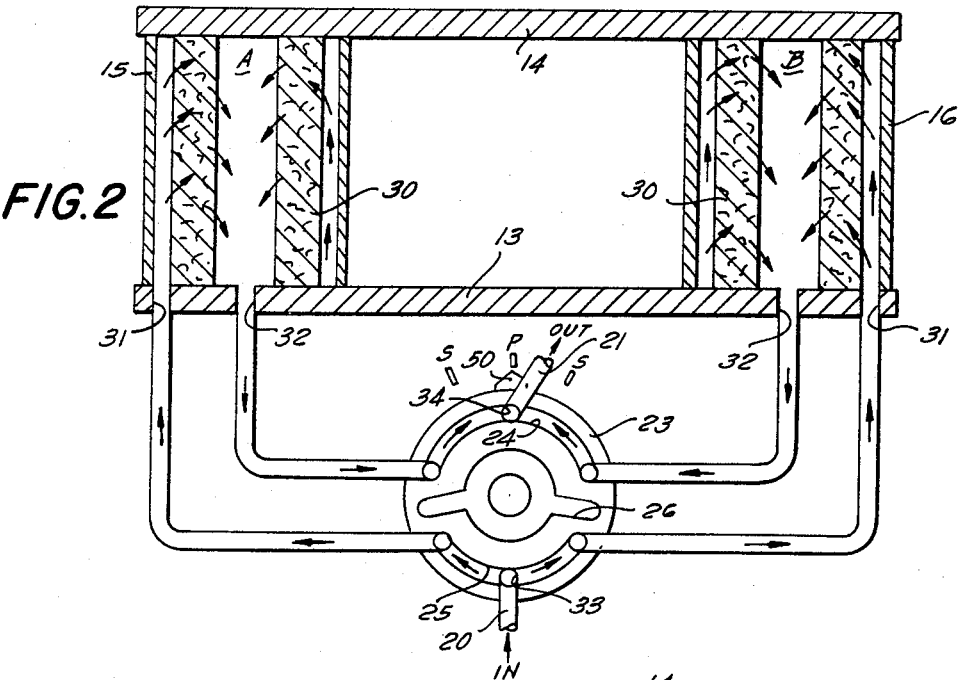
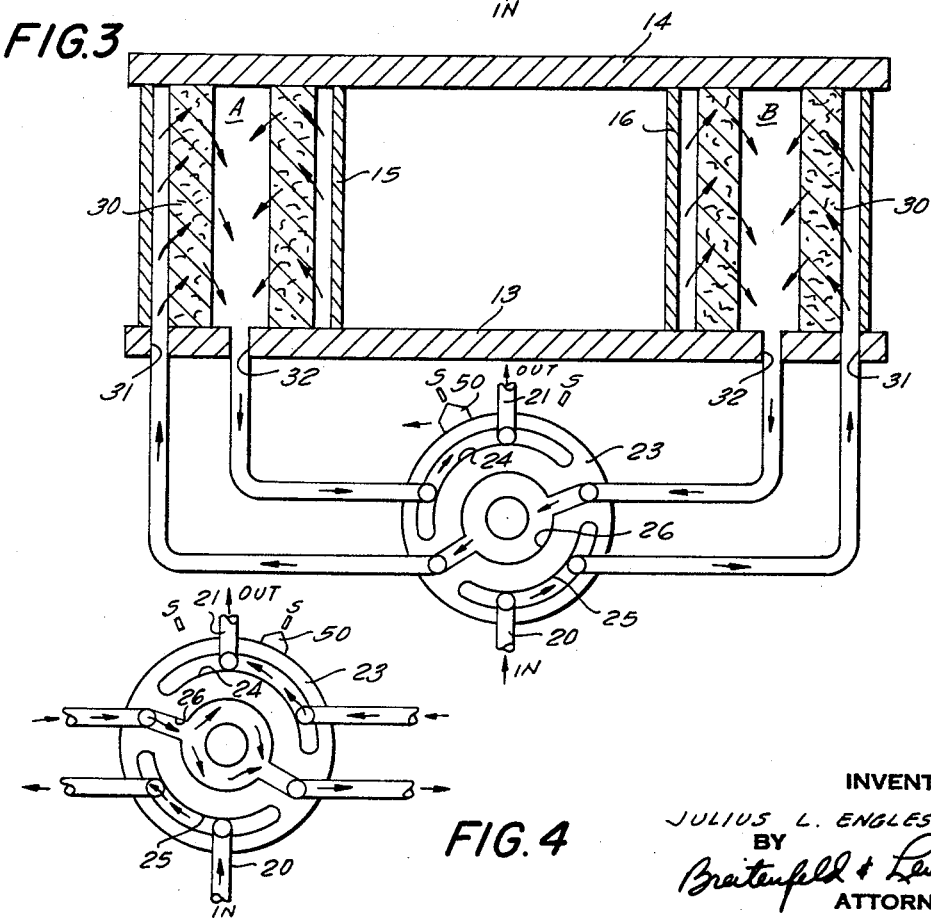
INVENTOR:
JULIUS L. ENGLESBERG
BY
Breitenfeld & Levine
ATTORNEYS

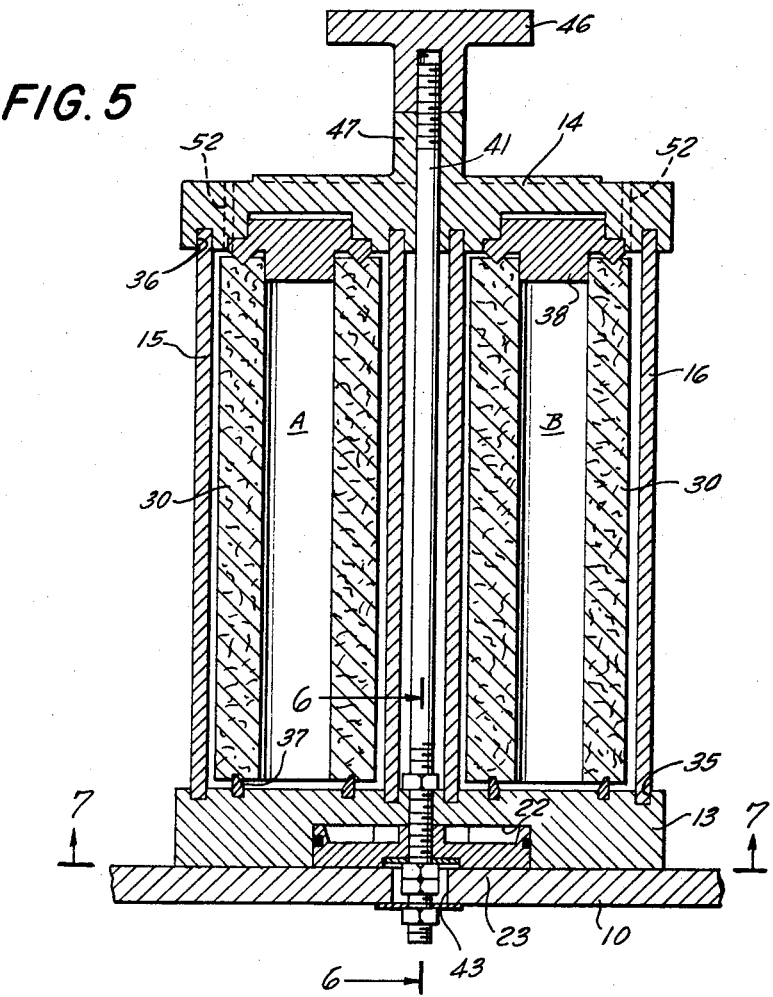

United States Patent Office 3,396,847
Patented Aug. 13, 1968

3,396,847
FILTERING APPARATUS ADJUSTABLE FOR SERIES OR PARALLEL FILTRATION
Julius L. Englesberg, 123 Knollwood Road,
Rockville Centre, N.Y. 11570
Filed Jan. 13, 1967, Ser. No. 609,182
7 Claims. (Cl. 210—85)

ABSTRACT OF THE DISCLOSURE

Apparatus comprising two filter chambers, and a valve incorporated within the base of the apparatus for selectively directing liquid to be filtered through both chambers simultaneously, or through the chambers in succession in either direction. Valve is a rotatable circular disk formed with channels in one face for selectively communicating with the inlet and outlet ports of the chambers and the liquid supply and exhaust ports of the apparatus.

---

This invention relates to filtering of liquids, and more particularly to a so-called "duplex" filtering apparatus comprising two separate filter chambers, or sets of filter chambers.

Devices of this type are known which are constructed so as to pass liquid to be filtered through both filter chambers simultaneously, thus producing "parallel" filtration. It is also known to construct such devices so that they pass liquid to be filtered first through one of the filter chambers and then through the other, thereby producing "series" filtration. Furthermore, valves have been associated with duplex filtering apparatus for the purpose of controlling liquid flow at any one time through one or the other, but not both, of the chambers. The reason for the use of such valves has been to permit cleaning or replacement of the filters within the chambers without interrupting the filtering operation.

It is a general object of the present invention to provide a duplex filtering apparatus which is more versatile than any heretofore known.

It is a more particular object of the invention to provide such a filtering apparatus capable of producing, as desired, parallel filtration, or series filtration in either direction through the filter chambers. This is accomplished by incorporating a valve into the apparatus shiftable between three positions. In one position of the valve, liquid flows simultaneously through both filter chambers. When the valve is moved to a second position, liquid flows first through one of the chambers and thereafter through the other chamber. Shifting the valve to a third position causes liquid to flow through the latter chamber first and then through the former.

It is another object of the invention to furnish the valve unobstrusively within the base of the apparatus so that it in no way interferes with the mounting of the apparatus on a support surface.

It is a further object of the invention to provide such an apparatus with a valve which can readily be manually shifted to any of its positions.

It is an additional object of the invention to provide such an apparatus wherein the base of the apparatus serves as a valve body, and the valve is a simple one piece circular disk rotatably mounted within the base.

Other objects and features of the invention will be apparent from the following description, in which reference is made to the accompanying drawings.

In the drawings:

FIG. 1 is a perspective view of a duplex filter installation;

FIGS. 2, 3, and 4 are schematic views showing the three positions of the valve and the filtration path resulting from each valve position;

FIG. 5 is a vertical cross-sectional view through the filter apparatus;

FIG. 6 is a fragmentary cross-sectional view, on an enlarged scale, taken on line 6—6 of FIG. 5;

Figure 1:
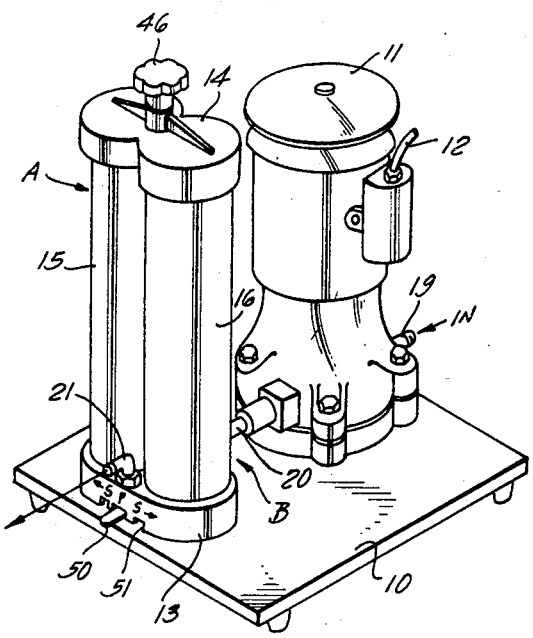

The filtering apparatus chosen to illustrate the present invention may be mounted on a suitable support surface, such as the platform 10 shown in FIG. 1. Also mounted on the platform is a housing 11 enclosing a pump in its lower portion and an electric motor for driving the pump in its upper portion. Power for energizing the motor is supplied through a conductor 12.

The filtering apparatus comprises, generally, a base 13, two filter chambers A and B supported on the base, and a cover plate 14 closing the upper ends of the chambers. The chambers A and B are defined by cylindrical walls 15 and 16, respectively. Although only one chamber A and one chamber B are illustrated, it is to be understood that there may be a bank or series of filter chambers A and a bank of filter chambers B, with suitable conduits linking together the chambers of each bank. When the apparatus is in operation, liquid to be filtered enters the pump through a conduit 19, leaves the pump and is supplied to the filtering apparatus through conduit 20, and the filtered liquid is exhausted from the filtering apparatus through a connection 21.

The base 13 is formed with a circular depression 22 in its bottom face (see FIGS. 5–7), and a disk valve 23 is rotatably accommodated within the depression 22. By means of the disk 23, the path of fluid flow through the apparatus may be controlled. For this purpose, the upper face of the disk 23 (FIG. 8) is provided with two arcuate channels 24 and 25, and a substantially diametrically arranged channel 26 between them, the channel 26 having a circular central portion surrounding a hole 27 passing through the disk. The channels 24–26 extend into the disk for about one-half its thickness.

The manner in which the valve disk 23 controls liquid flow through the apparatus is illustrated in FIGS. 2–4. In FIG. 2, the valve disk is located in its center position for producing parallel flow through the chambers A and B. Each chamber houses a cylindrical filtering element, or filter tube 30, and is provided with an inlet port 31 communicating with the annular region of the chamber between the filter tube 30 and the wall 15 or 16. The outlet port 32 of each chamber communicates with the interior of the filter tube. Fluid to be filtered enters through conduit 20 and flows simultaneously to inlet ports 31 of chambers A and B through channel 25 in disk 23. The fluid then flows through the filters 30, as indicated by the arrows, and leaves the chambers A and B through outlet ports 32. Fluid from both outlet ports flows simultaneously through channel 24 in valve disk 23, and exits from the apparatus through fitting 21. When performing parallel filtration as just described, the filter tubes 30 in chambers A and B will ordinarily be identical.

If it is desired to employ the same apparatus to perform series filtration, first through chamber B and then through chamber A, the valve disk 23 is rotated to the position shown in FIG. 3. In series filtration, the filter tube 30 in chamber B may be a coarse filter, and the filter tube in chamber A a finer filter. In the alternative, the filter tube in chamber B may be of a special nature, such as will effect carbon treatment of the liquid, and the filter tube in chamber A may be of a different nature. Whatever the case, liquid entering through conduit 20 is directed by channel 25 to inlet port 31 of chamber B. The filtered liquid leaves chamber B through its outlet port 32 and is directed by channel 26 to the inlet port 31 of chamber A. After being filtered in chamber A, the liquid leaves through outlet port 32 and is directed to exit connection 21 by channel 24.

If it is desired to reverse the direction of series filtration, i.e., cause the liquid to flow through chamber A first and then through chamber B, the valve disk is rotated to the position shown in FIG. 4. Although the chambers are not shown in this figure, the flow path through the apparatus will be obvious in view of the above discussion.

Figure 7:
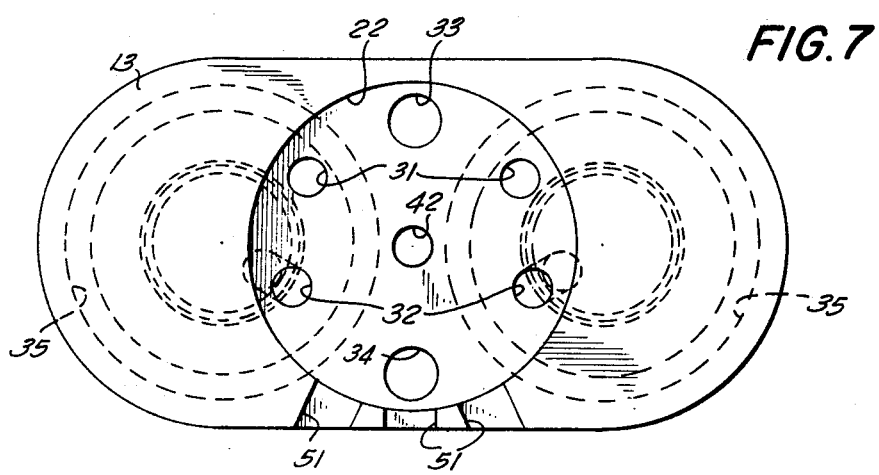
FIG. 7 is a horizontal cross-sectional view, on an enlarged scale, taken on line 7—7 of FIG. 5 but with the valve and stem removed.
Figure 8:
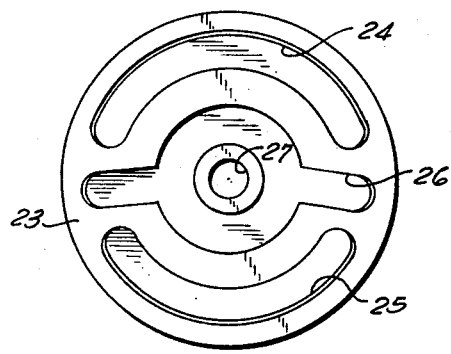
FIG. 8 is a plan view of the upper face of the valve disk.

The actual locations in the base 13 of the ports and connections referred to in FIGS. 2–4 are shown in FIG. 7. Arranged at diametrically opposed points in the top wall of the depression 22 are a supply opening 33 which communicates with conduit 20, and an exhaust opening 34 which communicates with fitting 21 (see also FIG. 6). The inlet ports 31 extend vertically through the base 13 and lie on a circle drawn through the openings 33 and 34 and having as a diameter a line drawn between these openings. The outlet ports 32 extend at an angle through the base so that at their upper ends they open into the regions surrounded by the filter tubes, and at their lower ends they open on the circle defined above. Since FIG. 7 is a bottom view of the base 13, it will be appreciated that if the base is turned over on to the valve disk of FIG. 8, the orientation will be identical to that illustrated in FIGS. 2–4.

The structure of the remainder of the filtering apparatus is shown in more detail in FIGS. 5 and 6. The upper surface of the base 13 is formed with two circular grooves 35 for accommodating the lower ends of the walls 15 and 16. Similarly, the bottom face of the cover plate 14 is provided with circular grooves 36 for accommodating the upper ends of walls 15 and 16. Mounted on the upper surface of the base, within each groove 35, is a seat 37 for the lower end of a filter tube 30, and mounted on the bottom face of the cover plate 14, within each groove 36, is a guide and seat member 38 for the upper end of a filter tube.

To insure that all liquid flow between the ports 31 and 32 occurs through the filter tubes 30, the seats 37 and 38 must be clamped very tightly against the ends of the filter tubes. This is accomplished by means of a stem 41 threaded at both ends and passing through a hole in the cover plate 14, a hole 42 (FIG. 7) in the base, the hole 27 in the valve disk, and a hole 43 in the platform 10. The nuts 44 (FIG. 6) on the lower end of the stem serve to secure the base 13 to the platform 10. The nuts 45 serve to press the valve disk 23 against the top wall of the depression 22, but not so tightly as to prevent rotation of the disk. An internally threaded handwheel 46 is threaded on the upper end of the stem 41, and engages a boss 47 projecting upwardly from the cover plate. Consequently, turning the handwheel 46 in the appropriate direction urges the base 13 and cover plate 14 toward each other.

The depth of the depression 22 is equal to or slightly greater than the thickness of the disk 23 so that the disk does not interfere with the mounting of the base 13 on the platform 10. The lower face of the valve disk is provided with a straight slot or groove 48 which snugly accommodates a thin strip 49 of springy or flexible material. One end of the strip 49 extends beyond the edge of the disk 23, and forms a graspable handle 50. The handle 50 is adapted to fit into any one of a series of three notches 51 (FIGS. 1, 6, and 7) provided in the lower face of the base 13 and extending between the depression 22 and one edge of the base. Each notch corresponds to a different one of the three working positions of the valve disk illustrated in FIGS. 2–4. To rotate the disk 23, the handle 50 is depressed to release it from the notch 51 within which it is seated, downward movement of the handle being permitted by the resilience of strip 49, and pushed laterally. When the handle becomes aligned with a different notch 51, it is released and it springs into the notch.

The cover plate 14 is provided with vent holes 52 to permit escape of air from the chambers as they are filled with liquid. Suitable plugs (not shown), are provided for closing the holes 52 after filling has been completed. An O-ring 53, located within an annular groove in the edge of the valve disk 23, may be employed to provide a liquid-tight seal between the edge of the disk and the wall of the depression 22, while permitting relative movement between the disk and base. The materials chosen to fabricate the parts of the apparatus will depend upon the liquid being filtered. However, for example, the walls 15 and 16 may be formed of a transparent material such as glass or plastic, and the base, cover plate, and valve disk may be formed of a plastic, such as a suitable epoxy.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A filtering apparatus comprising:
   (a) a base,
   (b) first and second filtering chambers supported on said base,
   (c) a filter element in each chamber,
   (d) inlet and outlet ports formed in said base and located in each chamber on opposite sides of the filter element therein,
   (e) supply conduits for conducting liquid to be filtered to said chambers and exhaust conduits for conducting filtered liquid from said chambers,
   (f) a valve for selectively effecting:
      I. simultaneous communication between said supply means and said inlet ports and between said exhaust means and said outlet ports,
      II. communication between said supply means and the inlet port of said first chamber, between said exhaust means and the outlet port of said second chamber, and between the outlet port of said first chamber and the inlet port of said second chamber, and
      III. communication between said supply means and the inlet port of said second chamber, between said exhaust means and the outlet port of said first chamber, and between the outlet port of said second chamber and the inlet port of said first chamber, as desired,
      said valve being a circular disk movably mounted on said base, said disk being provided with channels in one of its faces, and
   (g) means for rotating said disk to selectively bring said channels into communication with said ports and conduits.

2. A filtering apparatus as defined in claim 1 wherein said ports and conduits terminate at said valve in a generally circular pattern of openings, and said channels include a substantially diametrically arranged channel, and an arcuate channel on each side of said diametrical channel.

3. A filtering apparatus as defined in claim 1 wherein said chambers include cylindrical walls mounted on said base, a cover plate engaging the ends of said walls opposite to said base, a stem passing through both said cover plate and base, and fastener means secured to said stem for urging said cover plate and base toward each other to tightly clamp said walls between them, said stem passing through said valve disk, the latter being rotatable about said stem.

4. A filtering apparatus as defined in claim 1 wherein said chambers are supported on one face of said base, the other face of said base being provided with a circular depression for rotatably accommodating said valve disk, said depression being at least as deep as the thickness of said disk whereby said disk does not project beyond said other face of said base and consequently can be freely rotated when said base is mounted on a support surface.

5. A filtering apparatus as defined in claim 4 including means between the edge of said disk and the walls of said depression for providing a liquid tight seal.

6. A filtering apparatus as defined in claim 1 wherein said valve disk is provided with a groove in its other face, and said rotating means includes a member snugly accommodated within said groove and projecting beyond the edge of said disk to provide a graspable handle.

7. A filtering apparatus as defined in claim 6 wherein said base is provided with three notches adjacent to said disk corresponding to the three positions of said valve, and said member is a flexible strip normally positioned to be accommodated by one of said notches, said handle being depressible to disengage said strip and said notches, whereby said strip and hence said disk can be rotated to align said handle with any one of said notches, said handle when released springing into the notch with which it is aligned.

References Cited
UNITED STATES PATENTS

| | | | |
|---|---|---|---|
| 837,658 | 12/1906 | Bayley | 210—340 X |
| 2,473,032 | 6/1949 | LeClair | 210—340 |
| 3,236,095 | 2/1966 | Gelder | 210—340 X |
| 3,278,036 | 10/1966 | English | 210—340 X |

REUBEN FRIEDMAN, *Primary Examiner.*

J. ADEE, *Assistant Examiner.*